United States Patent [19]

Bergfeld et al.

[11] 4,208,496

[45] Jun. 17, 1980

[54] DUST REPELLENT PAINT

[75] Inventors: Robert A. Bergfeld, Montclair; Shashi P. Patel, Stanhope, both of N.J.; Lynn M. Schlickenrieder, Brighton, Mass.

[73] Assignee: N L Industries, Inc., New York, N.Y.

[21] Appl. No.: 894,842

[22] Filed: Apr. 10, 1978

Related U.S. Application Data

[63] Continuation-in-part of Ser. No. 765,070, Feb. 2, 1977, abandoned.

[51] Int. Cl.$^2$ .............................................. C08K 5/37
[52] U.S. Cl. ................................ 525/3; 260/29.6 MQ
[58] Field of Search ......... 260/539 R, 29.6 R, 29.6 E, 260/29.6 F; 252/356; 526/3

[56] References Cited

U.S. PATENT DOCUMENTS

| | | | |
|---|---|---|---|
| 3,006,881 | 10/1961 | Bolstad | 260/29.6 F |
| 3,172,910 | 3/1965 | Brace | 260/539 R |
| 3,752,796 | 8/1973 | Mueller | 260/29.6 F |
| 3,948,668 | 4/1976 | Hayek | 106/22 |
| 3,966,660 | 6/1976 | Tamura | 260/29.6 F |

*Primary Examiner*—Paul R. Michl
*Attorney, Agent, or Firm*—Gary M. Nath

[57] ABSTRACT

A paint composition incorporating a fluorochemical surfactant has been found to have excellent dust repellent characteristics when applied to either interior or exterior surfaces.

2 Claims, No Drawings

DUST REPELLENT PAINT

This application is a continuation-in-part of U.S. pat. application Ser. No. 765,070, filed, Feb. 2, 1977, now abandoned.

Many paint formulations have been developed and are sold for application to both interior and exterior surfaces. Typical paint formulations broadly comprise a combination of vehicle and pigment and are employed for two primary reasons, namely, to color or beautify the surface and also to add a protective coating to the surface. Typically the vehicle or film forming portion of the paints may be oils, acrylics, polyvinylacetates, alkyds and the like. The pigment portion of the paint system is also well-known and may comprise, for example, titanium dioxide and various other coloring pigmentary and filler materials. Some exterior paints are available in which the paint formulation has been so devised that the paint film after application to the exterior surface will weather or slowly deteriorate due to the action of sunlight, wind, air, rain, etc. This action is sometimes known as chalking and is effective where the exterior surface so painted is readily subjected to exposure to sunlight, rain, etc. Such paint surface also carries away the adherent dirt, etc. However, when such paints are applied to exterior surfaces such as under eaves or in locations where one does not have the usual exposure to the natural elements, the resulting paint films do not weather and do attract and hold dirt and dust; thus the surfaces may need repainting on a more frequent basis. The application of paint films to interior surfaces, however, represents a different problem with respect to keeping the surfaces clean. Such interior painted surfaces obviously are not amenable to the concept of weathering or chalking and, therefore, interior paints normally have hard and permanent film characteristics and should be capable of being washed with water or other cleaning solutions. In any event, the nature of the paint films produced by the currently available commercial paint systems is such that the film will attract dust and dirt. A unique paint system has now been developed that will effectively repel dust and dirt when the paint film is applied to either interior or exterior surfaces.

According to the present invention there is provided a paint composition containing a fluorochemical surfactant and which possesses excellent dust and dirt repellent characteristics when applied to either interior or exterior surfaces.

As hereinafter described in more detail, the paint composition of the instant invention contains a fluorochemical surfactant. The fluorochemical surfactants differ from the usual hydrocarbon-type surfactants by having a fluorocarbon chain, $F_3CCF_2CF_2 \ldots$, in the molecular configuration, and while Applicants do not propose to restrict themselves to the mechanism as may occur, it is believed that the presence of the fluorocarbon chain as it is present in the applied paint film causes a change in the surface characteristics so as to effectively retard dust and dirt particles as would normally adhere to the paint surface. It may well be that the fluorosurfactants lower the surface energies and in turn the force of adhesion, but irrespective of the mechanism involved, as will later by shown by examples and comparative data, the dust and dirt repellent characteristics of the fluorochemical surfactant containing paint films are superior to those of conventional paint systems.

Illustrative of the fluorochemical surfactants useful according to this invention include lithium and potassium salts of fluorinated carboxylic acid, ammonium salts of fluoroalkyl phosphate, short-chain oligomeric esters where the ester group is fluorinated. More specifically, preferred fluorochemical surfactants are perfluoroalkyl terminated alkylene thio lithium or potassium carboxylates more fully described in U.S. Pat. No. 3,172,910 incorporated herein by reference, such as $F(CF_2)_7CH_2CH_2SCH_2CH_2COOLi$ and others. However other chemical compositions falling within the chemical classes as herein broadly defined and containing the heretofore mentioned fluorocarbon chain may also be utilized. Betaines which also comprise a group of surface active agents containing quaternary ammonium groups and carboxylate groups within the molecule and described as having a positive charge at the quaternary ammonium nitrogen and a negative charge at the carboxylate group are also useful. Typical components of this type are more fully described in U.S. Pat. No. 3,839,425.

The fluorochemical surfactants may either be in solid or liquid form. They are generally water miscible and while they may be employed in solid form, it is the practice to add them to the paint composition in liquid form, for example as in an aqueous diluent or in an alcohol/water diluent. The amounts of fluorochemical surfactants described herein are based on the weight of solid surfactant incorporated in the paint composition. In actual practice if the fluorochemical surfactant as employed is one supplied in liquid form the percentage of solids contained therein is considered the active portion effecting the final paint composition and is at times referred herein as the "activity number".

In general, the fluorochemical surfactants may be anionic, cationic, nonionic or amphoteric in nature and the choice of one surfactant over another is in part dependent on its ease of incorporation and compatibility with the particular vehicle and pigment system involved.

Excellent results have been obtained using DuPont's "ZONYL" FSA which is an anionic fluorocarbon surfactant $F(CF_2)_7CH_2CH_2SCH_2CH_2COOLi$ available in liquid form and being 50% solids (surfactant), the diluent being isopropanol and water. 3-M's "FLUORAD" FC-128 has also been employed, this being an anionic potassium fluorinated alkyl carboxylate.

The fluorochemical surfactants are normally introduced into the paint formulations in relatively small proportions. A typical paint according to the invention would contain about one half pound of the surfactant per 100 gallons of paint, approximating about 0.05% by weight of the total paint composition. Effective dust repellent characteristics have been observed with the addition of about 0.12 pound surfactant to 100 gallons of paint, this representing about 0.012% by weight of the paint composition. A suggested range of surfactant addition would be between about 0.012–0.2% by weight, based upon the total weight of the paint composition. Depending on the choice of surfactants, improvements have been noted with additions up to 0.4% or 4 pounds of surfactant per 100 gallons of paint formulation. Since fluorochemical surfactants are expensive it is, of course, from the standpoint of economics, desirable to utilize minimum quantities sufficient to achieve the desired end result. Addition of more than about 4 pounds of surfactant per 100 gallons of paint formulation does not appear to give better results than does the addition of the lesser amounts mentioned herein.

While normally it would be the practice to incorporate the surfactant during the initial formulating of the paint, it is possible to add the fluorochemical surfactants disclosed herein to paints as are currently sold in the trade prior to surface application of such paints.

EXAMPLES

In order to show the benefit, that is, the excellent dust repellent characteristics, obtained when the fluorochemical surfactants are employed according to the teachings of this invention, a series of paint formulations were prepared. A first group of paints were made by techniques as usual to the industry, i.e. by mixing together the vehicle fractions and blending in the pigment, color and filler materials with agitation until a satisfactory paint blend resulted. This first group of paints were used as the control group.

A second group of paints were prepared identical in composition to the control group except for the addition of various types and amounts of the fluorochemical surfactants.

In order to test the comparative effectiveness of the flourosurfactant containing paint compositions against the control group, an empirical and accelerated test program was developed.

Basically, drawdowns of the control paint and the equivalent paint formulation containing the fluorochemical surfactant were prepared in side-by-side relationship on test panels and the paint films thus prepared were allowed to dry. The test panels were then placed in a plexiglass chamber at or near one end of the chamber. A prepared dust composition known as ASHRAE Synthetic Dust consisting of various metal oxides, cotton linters and carbon black was introduced into the chamber from the top at controlled rates meeting a stream of air forced into the chamber by blower means positioned generally at the opposite end of the chamber from the test panels. The dust in amounts of about 2.5 grams per minute was thus carried by the air stream to the test panel impinging thereon, being deflected upwardly and exhausted from the chamber. Test panels exposed to the dust for between about 20 and 30 minutes were then removed from the chamber and inspected to determine the actual degree of dust adherence to the paint films. The tests were carried out at temperature conditions normally present in the area of heating ducts in home use.

The actual composition of the ASHRAE Synthetic Dust as available from Air Filter Testing Laboratories, Inc., Louisville, Kentucky, is as follows:

| 72% Inorganic - Standardized Synthetic Fine | | |
|---|---|---|
| Composed of: | silicon dioxide | 68.47% |
| | ferrous oxide | 4.58% |
| | aluminum oxide | 15.98% |
| | magnesium oxide | 4.77% |
| | calcium and sodium oxides | 6.19% |
| | | 100.00% |
| and standardized according to this particle size distribution: | $0-5\mu$ | $39 \pm 2\%$ |
| | $5-10\mu$ | $18 \pm 3\%$ |
| | $10-20\mu$ | $16 \pm 3\%$ |
| | $20-40\mu$ | $18 \pm 3\%$ |
| | $40-80\mu$ | $9 \pm 3\%$ |

23% Organic—Molocco Black with mean particle diam of 62 millimicrons and fixed carbon and ash of 99.5%.

5% Fibers—#7 cotton linters ground in a Wiby mill to pass 4 mm screen.

A rating of scale of 0–5 was used to indicate the relative differences between the control paint and the corresponding paint containing the fluorochemical surfactant. A rating of 0 indicated no observable difference between the control and the test paint. A rating of 5 indicated virtually no dust collection visible on the test paint film. A rating of 3 indicated considerable difference in the dust collection on the respective control and test drawdowns. A rating of 2 indicated an observable difference between the test paint and the control paint. For purposes of evaluation, all of the control paints were given a 0 value.

In addition the actual reflectance of the paint samples was measured and rated as $\Delta Y$ according to the following: $\Delta Y = Y_D - Y_C$ where $Y_D$ is the reflectance of the dust repellent paint sample after accelerated testing and $Y_C$ is the reflectance of the control paint after accelerated testing. The $\Delta Y$ figure may also be expressed as a measurement of the brightness of the paint panel containing the fluorochemical surfactant. The reflectance values were determined using the ASTM standard method designated E97–55 (Part 27 of the 1976 Annual Book of ASTM Standards.

EXPLANATION OF RATINGS

| EXPLANATION OF RATINGS | | |
|---|---|---|
| RATING | PERFORMANCE | EFFECT AS Y* |
| 5 | Excellent | 16+ |
| 4 | Very Good | 12–15 |
| 3 | Good | 8–11 |
| 2 | Fair | 4–7 |

TABLE I

COMPOSITION OF CONTROL PAINTS

| Sample No. and Type of Paint | Vehicle Type | Wt/Gal | PVC* | Viscosity** | Wt % $TiO_2$ | Wt % Extender | Wt % Vehicle Solids |
|---|---|---|---|---|---|---|---|
| 1 Interior Latex Flat Wall Paint | Vinyl Acrylic Copolymer | 11.40 | 49.0 | 88–98KU | 16.5 | 21.7 | 14.8 |
| 2 Interior Latex Flat Wall Enamel | Acrylic Copolymer | 11.28 | 34.8 | 80–90KU | 24.7 | 7.9 | 16.4 |
| 3 Interior Latex Satin Gloss Enamel | Acrylic Copolymer | 10.65 | 27.8 | 78–82KU | 23.2 | 2.3 | 18.2 |
| 4 Latex House Paint (Exterior) | Acrylic Copolymer | 11.42 | 40.3 | 82–92KU | 19.9 | 16.5 | 16.1 |
| 5 Latex House & Trim Enamel (Exterior) | Acrylic Copolymer | 9.26 | 9.0 | 70–80KU | 8.5 | — | 24.9 |
| 6 Super Latex House Paint (Exterior) | Acrylic Copolymer | 11.54 | 29.0 | 115–125KU | 27.9 | 6.4 | 20.9 |
| 7 Intense White Shake & Shingle Paint (Exterior) | Oleoresinous Alkyd | 11.63 | 51.9 | 85–90KU | 21.3 | 32.4 | 18.0 |
| 8 Super White Alkyd House Paint (Exterior) | Oleoresinous Alkyd | 10.70 | 24.4 | 85–95KU | 29.3 | 11.1 | 35.4 |
| 9 White Sash and Trim (Exterior) | Oleoresinous Alkyd | 10.66 | 24.4 | 85–95KU | 28.5 | 11.6 | 35.4 |
| 10 White (Interior) | Oleoresinous Alkyd | 12.14 | 66.6 | 86–92KU | 16.7 | 43.6 | 11.4 |

TABLE I-continued
COMPOSITION OF CONTROL PAINTS

| Sample No. and Type of Paint | Vehicle Type | Wt/Gal | PVC* | Viscosity** | Wt % TiO$_2$ | Wt % Extender | Wt % Vehicle Solids |
|---|---|---|---|---|---|---|---|
| 11 Alkyd Satin (Interior) | Oleoresinous Alkyd | 10.71 | 37.7 | 85–95KU | 25.9 | 17.6 | 23.2 |

*PVC-PIGMENT VOLUME CONCENTRATION
PVC = TOTAL VOLUME OF PIGMENTS / TOTAL VOLUME OF PIGMENTS + TOTAL VOLUME OF NONVOLATILE VEHICLE
**KU-KREBS UNIT-THICKNESS OR VISCOSITY MEASUREMENT

Eleven control paints representing those for both exterior and interior application were prepared using various vehicle and pigmentary ingredients. These control paints were made as shown by the particulars in Table 1.

As indicated in Table II various fluorochemical surfactants in the amounts indicated were incorporated in corresponding paint formulations used as controls and tested so as to determine the reactive dust repellent properties of the fluorochemical surfactant containing formulations.

TABLE II

| Test Paint No. | Additive | Weight Percent | Rating | Performance | Y |
|---|---|---|---|---|---|
| 1 | A | 0.05 | 3 | Good | 8–11 |
| 1 | D | 0.035 | 3 | Good | 8–11 |
| 1 | E | 0.1 | 3 | Good | 8–11 |
| 2 | A | 0.05 | 3 | Good | 8–11 |
| 3 | A | 0.05 | 2 | Fair | 4–7 |
| 3 | B | 0.04 | 2 | Fair | 4–7 |
| 3 | D | 0.035 | 3 | Good | 8–11 |
| 4 | A | 0.05 | 3 | Good | 8–11 |
| 4 | B | 0.04 | 3 | Good | 8–11 |
| 4 | C | 0.05 | 2 | Fair | 4–7 |
| 4 | D | 0.035 | 4 | Very Good | 12–15 |
| 4 | E | 0.1 | 5 | Excellent | 16+ |
| 5 | A | 0.05 | 2 | Fair | 4–7 |
| 5 | B | 0.04 | 2 | Fair | 4–7 |
| 5 | C | 0.05 | 3 | Good | 8–11 |
| 5 | D | 0.035 | 2 | Fair | 4–7 |
| 5 | E | 0.1 | 2 | Fair | 4–7 |
| 6 | D | 0.035 | 2 | Fair | 4–7 |
| 6 | E | 0.1 | 2 | Fair | 4–7 |
| 7 | A | 0.05 | 3 | Good | 8–11 |
| 7 | B | 0.04 | 2 | Fair | 4–7 |
| 7 | C | 0.05 | 2 | Fair | 4–7 |
| 7 | D | 0.035 | 2 | Fair | 4–7 |
| 8 | A | 0.05 | 5 | Excellent | 16+ |
| 9 | A | 0.05 | 5 | Excellent | 16+ |
| 9 | D | 0.035 | 2 | Fair | 4–7 |
| 10 | A | 0.05 | 3 | Good | 8–11 |
| 10 | F | 0.025 | 2 | Fair | 4–7 |
| 10 | G | 0.1 | 2 | Fair | 4–7 |
| 10 | H | 0.05 | 3 | Good | 8–11 |
| 11 | A | 0.05 | 3 | Good | 8–11 |
| 11 | B | 0.04 | 2 | Fair | 4–7 |
| 11 | C | 0.05 | 3 | Good | 8–11 |
| 11 | G | 0.1 | 2 | Fair | 4–7 |

| Fluorochemical Surfactant Additive | Chemical Class |
|---|---|
| A | Lithium salt of fluorinated carboxylic acid. (ZONYL® FSA-F(CF$_2$)$_7$CH$_2$CH$_2$SCH$_2$CH$_2$COOLi) |
| B | A "betaine" (⊕ chg 'N' on one end, ⊖ chg 'O' on other end). (ZONYL FSB) |
| C | Perfluoro tertiary amine that is quaternized. (ZONYL® FSC) |
| D | Ammonium salt of fluoroalkyl phosphate. (ZONYL® FSD) |
| E | Potassium salt of fluorinated carboxylic acid (not "perfluoro"). (FLUORAD FC-128) |
| F | Ammonium salt of carboxylic acid. (FLUORAD FC-120) |
| G | Short-chain oligomeric ester where ester group is fluorinated (FLUORAD FC-430) |
| H | Short-chain oligomeric ester where ester group is fluorinated (FLUORAD FC-431) |

The comparative results clearly show the superiority of the instant invention as against paints containing no fluorochemical surfactant.

While the use of fluorochemical surfactants has been emphasized, it is possible to employ other materials exhibiting the same phenomenon in the paint film with respect to dust repellent characteristics. Such materials may include silicone oils, silicone resins and heteropolymers such as acrylic-styrene-acrylonitrile terpolymers, acrylic-styrene copolymers and other vinyl acrylic resins that have been fluorinated.

A typical paint composition including normal ingredients plus a fluorochemical surfactant and useful as a dust repellent interior latex wall finish will have the following general composition:

| Material | Lbs/100 Gals | Wt. % |
|---|---|---|
| Water (Solvent) | 500. | 42 |
| Bacteriocide | 1.1 | 0.08 |
| Hydroxyethyl Cellulose Thickening Agent | 5.0 | 0.42 |
| Potassium Tripolyphosphate and other Wetting Agents | 10. | 0.8 |
| Ethylene Glycol (Solvent Antifreeze) | 33.0 | 2.8 |
| Defoamer | 5.5 | 0.4 |
| Pigment and Extenders | 470. | 39.6 |
| Coalescent | 10.0 | 0.8 |
| Vinyl Acrylic Copolymer | 148.5 | 12.5 |
| Ammonium Hydroxide Buffer | 2.0 | 0.2 |
| Lithium Salt of Fluorinated Carboxylic Acid (50% Fluorosurfactant Solid in Solution) (ZONYL® FSA) | 0.5 | 0.05 |
| Pigment Volume Concentration | = 51.7 | |
| Pigment + Extender Wt. % | = 39.6 | |
| Vehicle Solids Wt. % | = 13.9 | |

While this invention has been described and illustrated by the specification and examples shown, it is not intended to be strictly limited thereto, and other variations and modifications may be employed within the scope of the following claims.

It is claimed:

1. In a paint composition having a vehicle portion selected from the group consisting of vinyl acrylic copolymers, acrylic copolymers and oleoresinous alkyds the improvement of increasing the dust repellent characteristics thereof by incorporating therein between about 0.012 and about 0.4 percent by weight, based upon the total weight of the composition, a fluorochemical surfactant consisting essentially of F(CF$_2$)$_7$CH$_2$CH$_2$SCH$_2$CH$_2$COOLi.

2. Paint composition according to claim 1 wherein the fluorochemical surfactant is present in amounts between about 0.012 and 0.2 percent by weight, based upon the total weight of the composition.

* * * * *